March 13, 1951 — M. L. CAILLOUX — 2,545,258
DEVICE FOR TELE-CONTROL OF SPATIAL MOVEMENT
Filed March 22, 1945 — 2 Sheets-Sheet 1
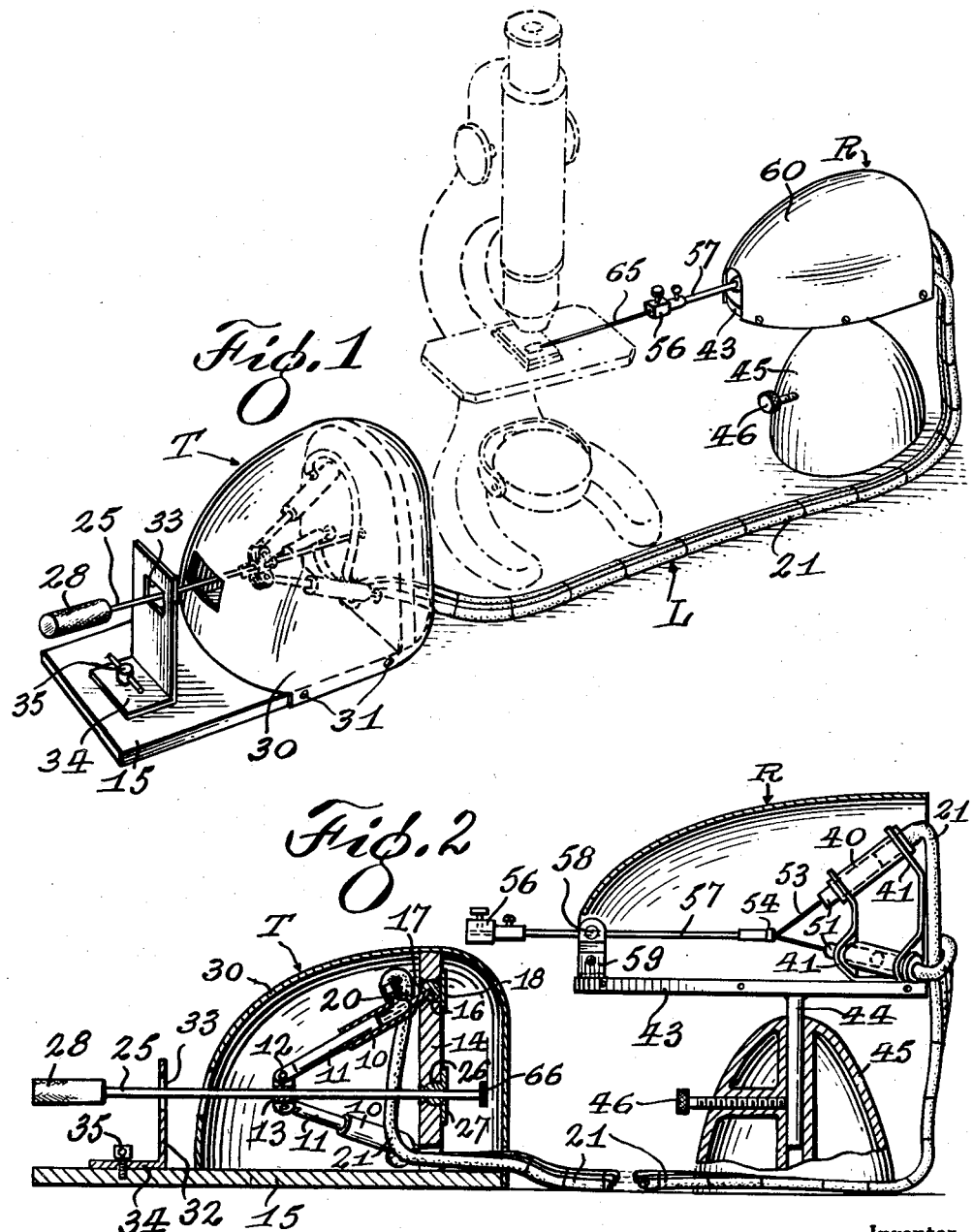
Inventor
Marcel L. Cailloux
By Robic & Bastien
Attorneys March 13, 1951  M. L. CAILLOUX  2,545,258
DEVICE FOR TELE-CONTROL OF SPATIAL MOVEMENT
Filed March 22, 1945  2 Sheets-Sheet 2
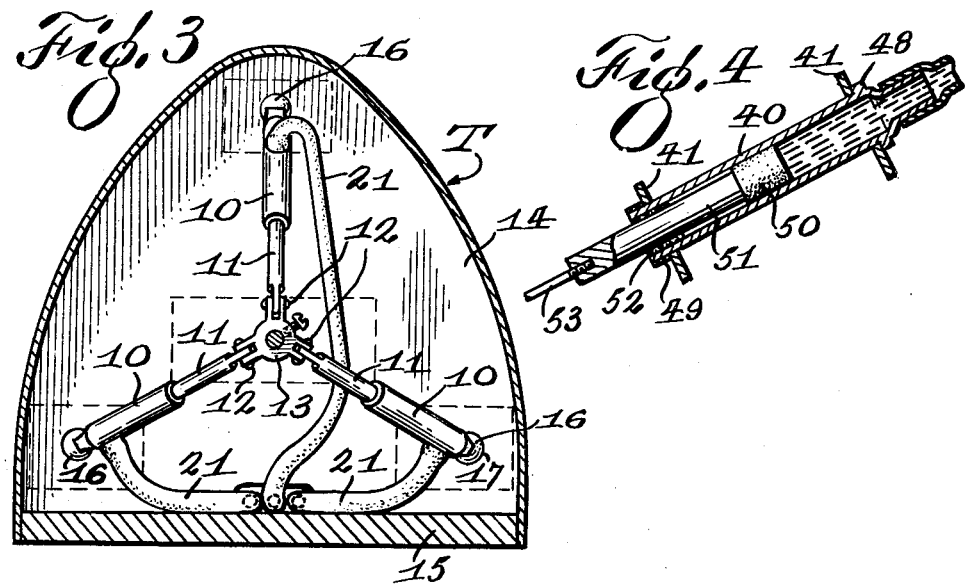
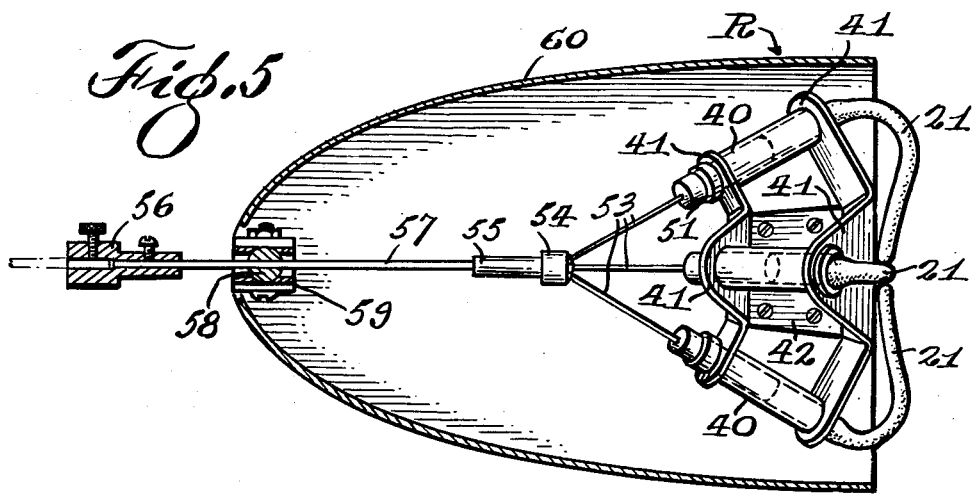
Inventor
Marcel L. Cailloux
By Robic & Bastien
Attorneys Patented Mar. 13, 1951

2,545,258

UNITED STATES PATENT OFFICE 2,545,258

DEVICE FOR TELECONTROL OF SPATIAL MOVEMENT

Marcel L. Cailloux, Montreal, Quebec, Canada

Application March 22, 1945, Serial No. 584,119

8 Claims. (Cl. 60—54.5)

The present invention relates to means for translating movements in space and, more particularly, for transmitting or translating movements from one point to another remote point instantaneously or in a differed, reduced or amplified manner.

Of course, and broadly speaking, apparatus or devices for movement transmitting purposes have been known and used extensively for quite a long time. But, the means disclosed heretofore either are not capable of translating movements outside of a given plane, or must possess independently operable mechanisms for coordinating said movements with others having a trajectory outside said plane, or are only capable of transmitting a rocking movement about a fixed pivot. In other words, the transmission and remote reproduction of movements occurring in space, in more than one plane, represents a problem which, so far, has not received a completely satisfactory and simple solution.

The present invention has been conceived to improve the movement-translating systems already known and to provide means whereby a movement can be reproduced at a distance whatever may be its trajectory in space.

As in all systems where a function has to be reproduced remotely, the present one comprises an apparatus for analyzing the original movement and transmit this analysis to a remote point; this apparatus is therefore called the "transmitter." The remote device, or appratus, which must co-ordinate this transmitted analysis and reconstitute the same into displacements corresponding to the original movement is, consequently, the receiver and may be linked or connected to the transmitter in a number of ways using, as the case may be, electrical, physical, and even chemical means.

Briefly described, the operating principle of both the transmitter and receiver is based on the angular, or linear, variation of at least three axes arranged in mutually converging position, the axes being joined together at their converging ends and individually fixed in triangular arrangement at their diverging ends in a plane spaced from the converging point or vertex. Thus, the said axes define, together, a triangular pyramid.

The vertex of this pyramid is displaceable and adapted to follow, in space, the trajectory of the movement, or motion, to be transmitted. Inasmuch as the base ends of the axes are fixed, it is evident that the angular relation of the axes together, and with respect to the base, is continuously variable as the vertex is displaced to follow a given trajectory in space; also, due to the securing of the axes at both ends, it is clear that said axes will be elongated, or contracted, longitudinally during this displacement. In other words, deformation of the pyramid will cause spatial disturbances of the axes.

If, therefore, this deformation of the pyramid is recorded in each axis, and suitably transmitted, either as a function of longitudinal changes or angular relation, the reconstruction of this deformation in an homologous remote pyramid will result in a trajectory of the remote pyramid vertex exactly simulating the original trajectory.

The actual means used for detecting the pyramid deformation, or causing a recreated deformation in a remote pyramid, are almost limitless and various possibilities will at once suggest themselves for specific practical applications. Electrical, hydraulic, pneumatic or mechanical means are among those which can most easily be applied and used, several variations of each being possible, singly or in combination.

Consequently, and with the foregoing in view, the main object of the invention resides in the provision of an improved system for remotely translating the trajectory of movements occurring in space, or in a three-dimensional area.

An important object, also, is the provision of a system of the character described which is accurate and adaptable to be performed by physical, electrical or even chemical means.

Another object evisages a movement translation system which is simple, reliable and based on an operating principle such that the devices therefor are capable of reproducing any movement in the most direct manner.

A further object of the invention contemplates means for remote motion translation which include a single point for following, or remotely recreating, the trajectory of any movement in space, whether continuous or interrupted.

Other objects and advantages of the invention will become apparent, or be pointed out further, during the description to follow.

As stated previously, the system of the invention is applicable to an almost indefinite number of practical applications in all fields of human endeavor.

As a specific embodiment of the invention, among others, an example is given herein of a micro-manipulator, of improved character, constructed and operated in accordance with the principles of the present system. This is shown in the accompanying drawing wherein:

Figure 1 is a perspective view of the embodiment of the invention, comprising a micromanipulator including a transmitter and a receiver, both of said devices being operatively associated with a microscope shown in dotted lines, Figure 2 is a vertical sectional view taken longitudinally through both the transmitter and receiver, Figure 3 is an end view of the transmitter mechanism, Figure 4 is a longitudinal section through one of the receiver pistons, and Figure 5 is an enlarged plan view of the receiver with the casing thereof and the ball joint shown in section.

Referring to the drawings wherein similar reference numerals represent corresponding parts throughout, the letter T indicates generally the transmitter, and the letter R the receiver, both of which are connected together in the present instance by the flexible line L since the embodiment described herein is operated by hydraulic pressure.

An examination of the figures, and more particularly Figures 2, 3 and 5, will show that both the transmitter and receiver are very similar to each other and include in each case the pyramidal arrangement of converging axes which, in the present case, are constituted by pistons moving axially within cylinders. The only difference existing between the piston arrangement of the transmitter and that of the receiver is one of size only, the transmitter piston being much smaller than the receiving piston, since a micromanipulator is naturally intended to reduce the transmitted movement to a value suitable for microscopic examination, as is evident. Obviously, the reverse may be true in cases where movements are to be reproduced with an increased amplitude, both of which possibilities being well within the spirit of the invention.

The pyramidal arrangement of the three axes forming the basis of the present invention is shown more particularly in Figure 3, each of said axes being formed of an elongated cylinder 10, open at one end and in which a suitable piston 11 is slidable, said piston extending outside of the cylinder and having its outer end pivoted or otherwise connected at 12 to a triangular bracket 13. Said bracket forms the vertex of the pyramid and constitutes, in effect, the point of convergence of the three axes represented by the piston and cylinder. The other closed end of the cylinder is secured to the plane already described which forms the base of the pyramid and which base is comprised, in the present instance, of a vertical partition or the like 14 secured vertically, and at right angles, to the base 15 of the transmitter T. The pivot for the closed end of said cylinder consists of balls 16 disposed in suitable cavities 17 arranged in triangular formation in the partition 14 and closed on the outside by plates 18 to retain the said balls in the cavities against lateral movement. Finally, each cylinder 10 is provided, near its pivot end, with a small outlet 20 over which a rubber or other flexible tube or line 21 is inserted for affording communication of the cylinder 10 with the corresponding cylinder of the receiver.

The mechanism described above constitutes the deformable pyramid already mentioned and which, as is evident, will be deformed to the extent of its vertex displacement. From the figures and the foregoing description, it is obvious that the bracket 13 can be displaced in any direction an extent limited only by the physical size of the axes or pistons. And, of course, displacement of this vertex will be translated by an extension or contraction of each individual axis and an accompanying triangular change between said axis and the base represented by the partition 14.

The movements to be transmitted are applied to the vertex bracket 13 by means of a rod 25 slidable longitudinally in the centre of a ball 26 mounted in the same fashion as balls 16 and held in place also by a plate 27. The outer end of the rod 25 extends outside of the partition 14 and may be terminated by a knob or the like 28. So as to protect the mechanism from damage a cover 30 may be disposed over the piston and cylinder assembly and secured to the base by means of the screws 31. In order to limit the amplitude of movement imparted to the bracket 13, so as to confine the amplitude of said movement to that which is observable in the field of a microscope, a stop plate 32 is provided, having an aperture 33 in the upper part thereof and which plate is bent at its lower portion to form a foot 34 secured to the base 15 by a set screw or the like 35; thus, the motion imparted to 28 will be confined to that possible by the physical size of the piston and cylinder and also to the limited field of a microscope.

The receiver R, shown in detail in Figures 2 and 5, comprises also the pyramidal arrangement of three converging axes, said axes consisting each in a cylinder 40 open at both ends and mounted at the outer end of parallel arms 41 arranged in triangular formation around a common base 42. Said base 42 is mounted on the platform 43 of the receiver, and which platform is secured to a post 44 movable up and down within a pedestal 45 and adjustable at a suitable height by the set screw 46. As shown to advantage in Figure 4, each of the cylinders 44 is held in the arms against longitudinal movement by the integral rib 48 formed at the outer end of the cylinder and an inner frictional collar 49. Each of the cylinders includes a piston 50 mounted at the end of a stem 51 and which stem is centered in the cylinder by means of the packing 52. Finally, the outer end of each stem 51 is provided with a rod or wire 53, each of which converges to a vertex constituted by the head 54 of a stud 55. The stud 55 is then connected to the micro-tool holder 56, or movement reproducer, through the intermediary of a rod 57 slidable through a ball 58 suitably mounted in an appropriate bracket 59 secured at the forward end of the platform 43. As is the case with the transmitter, the receiver may be provided with the cover 60 suitably attached to the platform 43.

Inasmuch as the particular embodiment of the invention described and illustrated herein operates on the hydraulic principle, the tube 21 constituting the line L between the transmitter and receiver may be suitably filled with a proper liquid such as a light viscosity oil or other non-freezing liquid. The particular mode of filling said tube is relatively unimportant and may vary according to circumstances and the particular construction chosen for the cylinder and piston of the receiver. It should be noted also that due to the very small movements encountered at the receiver, the rods 53 are rigidly connected together at 54, the inherent resiliency or flexibility of said rods being ample for the small amplitude of the movements encountered; furthermore, this particular construction eliminates all end play in the receiver, so that the micro-tool 65 is movable without back lash. Obviously, the construction of the receiver structure can be an exact duplicate of the transmitter one, the movements being the same in both except as to amplitude, when desired. It is noted also that a stop element 66 is attached to the transmitter rod 25 so that the pistons 11 may not be inadvertently withdrawn from the cylinders 10. The embodiment of the invention just disclosed aptly represents, it is believed, the principle and possibilities of said invention.

Whatever means are used to analyse and reconstruct the deformations of the transmitter pyramid are relatively unimportant, because said means may be varied at will, or according to circumstances, and are well within the knowledge of one conversant with this art.

Reviewing the particular example given herein, it will be noted that it is simple, flexible, stable and adaptable to a variety of purposes. For instance, the vertex 13 may be caused to follow any movement in space, without the intermediary of the rod 25, and the stud 55 consequently actuated to follow said movement in reverse, for obvious reasons.

In a micro-manipulator, therefore, the advantages resulting from this construction are:

1. All the movements of the micro-tools are controlled from a single knob and, as a result:
2. The instrument can be used expertly without specific training.
3. Back-lash and parasitic vibrations are eliminated,
4. Due to image inversion in the microscope, the instrument is easily disposable so that the micro-tool appears to be a continuation of the transmitter lever,
5. The ratio of demultiplication can be varied at will and manufacture of the instrument is simple and relatively free of accurately machined parts.

From the foregoing, it should be apparent that the invention is an advance in the art of movement transmission, since it constitutes a notable improvement over the methods and means used previously for the purpose.

It must be understood that the form of my invention herein shown and described is to be taken as a preferred example of the same, and that various changes as to the shape, size and arrangement of parts may be resorted to without departing from the spirit of the invention or the scope of the subjoined claims.

Having thus described my invention, I claim:

1. A micro-manipulator of the character described, comprising a trio of cylinders connected at one end in triangular position in a common plane, a piston in each cylinder extending therefrom and the outer end of which pistons are connected together to form the vertex of the pyramid constituted by the cylinders and pistons, said cylinders being adapted to be filled with a fluid, fluid ducts connecting each of said cylinders with corresponding cylinders disposed in similar fashion to form a remote pyramid with pistons in said remote cylinders, means for imparting a trajectory in space to the vertex of the first pyramid, and means on the vertex of the remote pyramid for reproducing the trajectory imparted to the vertex of the first pyramid, said means being mounted for universal movement.

2. A movement-translating apparatus having a transmitter and receiver of similar construction and connected together by fluid ducts, each of said transmitter and receiver comprising a pyramidal arrangement of at least three-converging cylinder and piston units joined together at their converging or vertex point and connected triangularly at their diverging points in a common plane to a fixed support, and means at each of the transmitter and receiver vertices for following and reproducing respectively a given trajectory in space, said means being mounted for universal movement.

3. Movement translating means comprising a pyramid constituted of at least three mutually converging elements capable of variation in length and connected at one end in a common plane defining the base of the pyramid, said elements being connected together at their other end to form the pyramid vertex, means for causing impulses corresponding to the elongations and contractions of each element as the vertex is spatially displaced, a second homologous remote pyramid also formed of converging elements capable of variation in length and connected at one end in a common plane and with their other ends connected together at the pyramid vertex, means for transmitting said impulses from the first pyramid to the remote pyramid, and means at each element of the remote pyramid for varying the length of said elements in accordance with the impulses received from the first pyramid, thereby recreating in the second pyramid deformations displacing spatially the vertex thereof in conformity with those of the first pyramid vertex.

4. Movement translating means, comprising a trio of converging linear elements arranged to form a triangular pyramid, said elements being capable of contraction or elongation and one end of which is fixed in a common plane and the other end joined to form the pyramid vertex, means for causing impulses corresponding to the linear variations in the elements as the vertex is spatially displaced, a second homologous remote pyramid consisting of elements corresponding to those of the first pyramid and similarly disposed, means connecting together the respective elements of each pyramid and through which impulses corresponding to the variations in the first pyramid elements are transmitted to the elements of the second pyramid, and means for varying the length of the elements of the second pyramid in accordance with the impulses transmitted thereto, whereby the vertex of said second pyramid is displaced spatially in exact agreement with the displacement of the first pyramid vertex.

5. In a micro-manipulator, at least three pulsators consisting of a cylinder and reciprocating piston therein disposed in pyramidal mutually converging position, the cylinders being connected at their outer end in a common plane to a fixed support and the pistons joined together to form the vertex of a pyramid, means to impart a trajectory to the vertex of this pyramid, a second remote pyramid formed also of piston-and-cylinder pulsators arranged in converging relation similarly to the first pyramid, fluid ducts connecting together in corresponding relation the cylinders of both pyramids, said ducts and cylinders being filled with a suitable fluid.

6. In an hydraulic movement transmission device, the combination of a transmitter and a receiver communicating by an hydraulic link for the transmission of a universal movement in space, said transmitter comprising at least three pulsators spacedly connected at their other end to a common element supported thereby, said receiver similarly comprising at least three pulsators spacedly connected at one end to a fixed support, mutually converging and connected at their other end to a common element supported thereby, said hydraulic link comprising liquid ducts communicatively connecting corresponding pulsators of the transmitter and the receiver, liquid filling said pulsators and said ducts, whereby a three dimensional displacement of the common element of the transmitter causes a corresponding three-dimensional displacement of the common element of the receiver.

7. An hydraulic movement transmission device comprising at least a transmitter, a receiver and a liquid link between said transmitter and said receiver, said transmitter consisting in at least three cylinder and piston units forming the three mutually converging edges of a pyramid, one end of the said units being separately connected to a fixed support, the other end of the said units being connected together to a common element supported thereby, said common element forming the vertex of said pyramid, said receiver consisting in a similar arrangement of cylinder and piston units joined at one end to a common element, said liquid link comprising at least three separate liquid ducts communicatively connecting corresponding cylinders of said receiver and said transmitter, liquid filling said cylinders and said ducts, whereby spatial displacement of the common element at the transmitter causes a corresponding spatial displacement of the common element at the receiver.

8. In a micro-manipulator, the combination of a transmitter and a receiver communicating by a liquid link, said transmitter comprising at least three pulsators capable of longitudinal variation and disposed in pyramidal mutually converging positions, said pulsators being spacedly connected at their outer end in a common plane to a fixed support and joined at their other end to form the vertex of a pyramid, said receiver being similarly constituted by at least three pulsators arranged in converging relation to form a pyramid, said liquid link comprising fluid ducts connecting together in corresponding relation the pulsators of both pyramids, said ducts and said pulsators being filled with a suitable fluid, means capable of universal movement mounted on the vertex of the transmitter pyramid to impart a trajectory thereto.

MARCEL L. CAILLOUX.

REFERENCES CITED

The following references are of record in the file of this patent:

UNITED STATES PATENTS

| Number | Name | Date |
|---|---|---|
| 1,035,849 | Bergens | Aug. 20, 1912 |
| 1,270,163 | Jesurun et al. | June 18, 1918 |
| 1,694,477 | Long | Dec. 11, 1928 |
| 1,987,733 | Fonbrune | Jan. 15, 1935 |
| 2,198,965 | Habig | Apr. 30, 1940 |
| 2,373,745 | Conway | Apr. 17, 1945 |

FOREIGN PATENTS

| Number | Country | Date |
|---|---|---|
| 664,224 | France | Apr. 22, 1929 |
| 650,368 | Germany | Sept. 23, 1937 |